United States Patent [19]
Solomond et al.

[11] Patent Number: 6,079,700
[45] Date of Patent: Jun. 27, 2000

[54] VEHICLE SHOCK ABSORBER SPRING SEAT PAD HAVING A SPRING—CONTAINMENT PERIPHERAL FLANGE

[75] Inventors: Jonathan P. Solomond, Farmington Hills; Michael S. Weaver, Clarkston; James J. Johnson, Metamora, all of Mich.

[73] Assignee: Chrysler Corporation, Auburn Hills, Mich.

[21] Appl. No.: 09/169,247

[22] Filed: Oct. 9, 1998

[51] Int. Cl.[7] ................................................ B60F 11/16
[52] U.S. Cl. .......................... 267/221; 280/124.55; 267/33
[58] Field of Search ...................... 280/124.145, 124.146, 280/124.147, 124.154, 124.155; 267/33–35, 140.4, 141.4, 141.5, 152, 153, 170, 174, 179, 221; 248/633, 638

[56] References Cited

U.S. PATENT DOCUMENTS

| | | | |
|---|---|---|---|
| 3,057,640 | 10/1962 | Soer | 280/96.2 |
| 3,414,278 | 12/1968 | Schmid | 267/221 |
| 3,573,880 | 4/1971 | Sakai | 280/96.2 |
| 3,727,940 | 4/1973 | Hug | 280/124.154 |
| 4,260,176 | 4/1981 | Pacis et al. | 280/668 |
| 4,260,177 | 4/1981 | Pflughaupt et al. | 280/124.155 |
| 4,482,135 | 11/1984 | Ishida et al. | 267/33 |
| 4,568,067 | 2/1986 | Iwata | 267/33 |
| 5,048,859 | 9/1991 | Nishikuma et al. | 280/668 |
| 5,074,579 | 12/1991 | Evangelisti | 280/668 |
| 5,421,565 | 6/1995 | Harkrader et al. | 267/220 |
| 5,454,585 | 10/1995 | Dronen | 280/660 |
| 5,470,049 | 11/1995 | Wohler et al. | 267/172 |
| 5,620,172 | 4/1997 | Fulks et al. | 267/221 |
| 5,947,459 | 9/1999 | Ducloux et al. | 267/34 |

*Primary Examiner*—Chris Schwartz
*Attorney, Agent, or Firm*—Lawrence J. Shurupoff

[57] ABSTRACT

The coil spring of a vehicle shock absorber is seated on an annular elastomeric pad that is equipped with a reinforced peripheral flange adapted to maintain the lowermost convolution of the spring on the elastomeric pad should the spring break during service. An annular steel band is incorporated into the elastomeric band to provide a reinforced flange structure resistant to deformation.

4 Claims, 3 Drawing Sheets

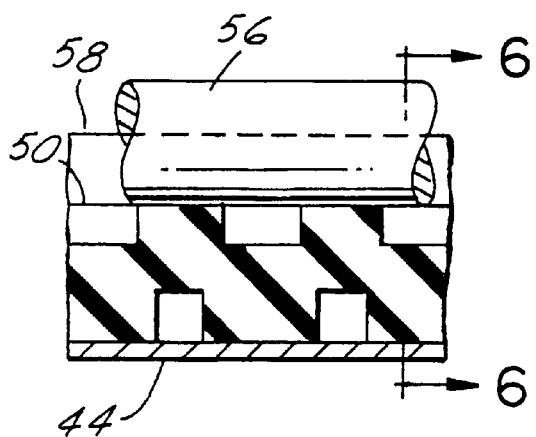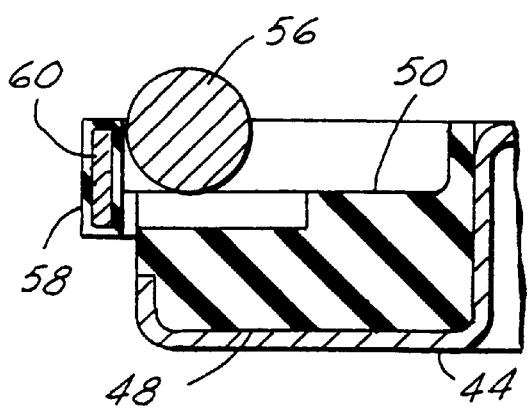

6,079,700

VEHICLE SHOCK ABSORBER SPRING SEAT PAD HAVING A SPRING— CONTAINMENT PERIPHERAL FLANGE

CROSS REFERENCE TO RELATED PATENT APPLICATIONS

This patent application discloses an invention that is closely related to inventions disclosed in our co-pending patent applications. Ser. No. (09/169,631), filed on Oct. 9, 1998 and Ser. No. (09/169,632, filed Oct. 9, 1998).

BACKGROUND AND SUMMARY OF THE INVENTION

This invention relates to a vehicle wheel suspension, and particularly to an annular elastomeric pad for seating the lower end of a coil spring that surrounds a shock absorber strut for the wheel suspension.

Wheel suspension of interest are shown in U.S. Pat. No. 4,721,325 to J. Mackovjak, U.S. Pat. No. 5,454,585 to G. Dronen et al, and U.S. Pat. 5,676,355 to N. Hayashi.

The vehicle suspension of particular interest comprises a shock absorber strut that includes an upstanding fluid cylinder having a piston rod connected to the vehicle body and a shock absorbing cylinder connected to the vehicle wheel suspension arm. The vehicle suspension further includes an upper spring seat and strut mount assembly attached to the piston rod and a lower spring seat attached to the shock absorbing cylinder. A coil spring is trained between the spring seats in surrounding relation to the shock absorber strut. The axis of the spring is offset from the axis of the shock absorber strut.

The present invention relates specifically to the construction of an annular elastomeric spring seat pad positioned on a rigid platform secured to the shock absorber cylinder for supporting the lower end of the associated coil spring. The elastomeric pad acts as an isolator for absorbing high frequency suspension noise.

The elastomeric pad of this invention has an upstanding peripheral flange that surrounds the lowermost convolution of the coil spring, whereby the flange acts to contain the spring in event of coil spring failure. The peripheral flange thereby prevents the failed spring from forcibly impacting the vehicle tire in such fashion as to produce a tire puncture. Specific features of the invention will be apparent from the attached drawing and description of an illustrative embodiment of the invention.

BRIEF DESCRIPTION OF THE DRAWINGS

FIG. 5 is a fragmentary transverse sectional view taken on line 5—5 in FIG. 2.

FIG. 6 is a fragmentary sectional view taken on line 6—6 in FIG. 5.

DESCRIPTION OF A PREFERRED EMBODIMENT OF THE INVENTION

Figure 1:
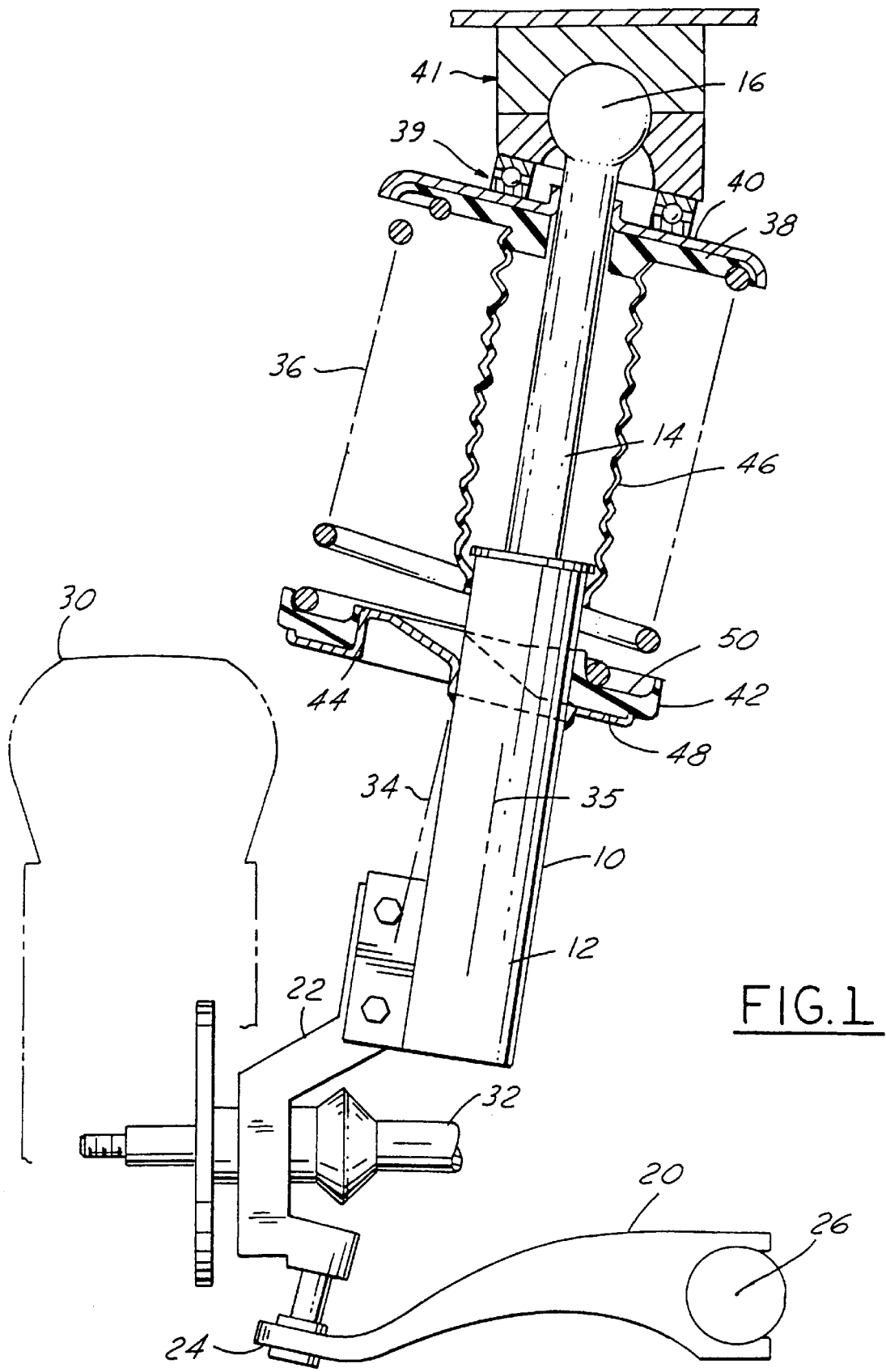
FIG. 1 is a longitudinal sectional view of a vehicle wheel suspension embodying an elastomeric spring seat pad constructed according to the invention.
Figure 3:
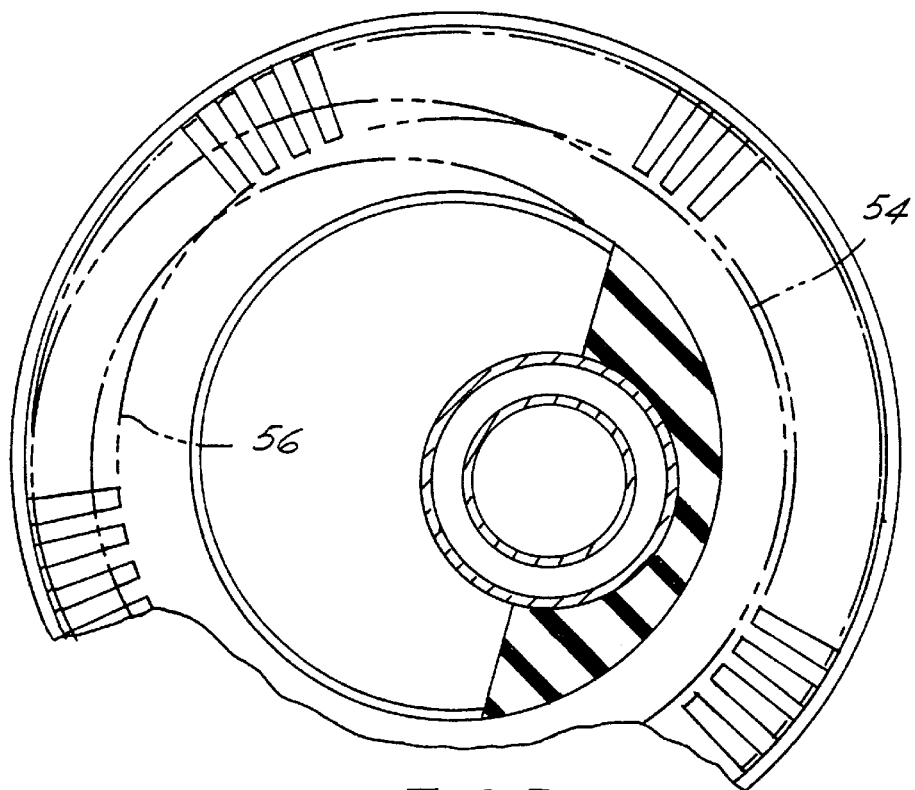
FIG. 3 is a fragmentary sectional view taken on line 3—3 in FIG. 2

Referring to FIG. 1, there is shown a vehicle wheel suspension that includes a shock absorber strut 10 having a fluid cylinder 12 and piston rod 14. The upper end of piston rod 14 has an elastic connection 16 with a vehicle body 18. The lower end of fluid cylinder 12 is connected to wheel suspension arm 20 via a bracket 22.

Bracket 22 has a ball-socket connection 24 with suspension arm 20. The suspension arm has a pivot connection 26 with the vehicle frame, whereby arm 20 can pivot around axis 26 in accordance with changes in the vehicle wheel position due to terrain irregularities.

Wheel 30 (shown in dashed lines) has an axle 32 that is rotatable in suitable bearings carried by bracket 22. The wheel can be steered around an axis 34 extending through ball-socket joint 24 by a steering arm, not shown. Shock absorber strut 10 has a longitudinal axis 35 offset at an angle from steering axes 34.

An annular coil spring 36 surrounds shock absorber strut 10 so as to be compressed by a decrease in the strut length. The coil spring generates a counteracting restoring force tending to maintain the vehicle body in a reasonably level attitude in spite of changes in shock absorber strut length associated with terrain irregularities.

The upper end of coil spring 36 is seated against an elastomeric isolator pad 38 carried on an upper platform 40. The upper spring seat/platform 40 is free to rotate around the piston rod by a bearing assembly 39. The bearing assembly is also in contact with the upper strut mount 41, which is suitably attached to piston rod 14. The lower end of coil spring 36 is seated against an elastomeric isolator pad 42 carried on a lower rigid platform 44 suitably attached to cylinder 12. Platforms 40 and 44 are preferably steel stampings.

Platform 44 and elastomeric isolator pad 42 are constructed so that the axis of coil spring 36 is angularly offset from the axis 35 of the shock absorber. In the illustrated position of the vehicle wheel, the spring axis is coincident with steering axis 34.

The illustrated wheel suspension includes an annular bellows-type dust cover 46 surrounding the piston rod 14 and a portion of cylinder 12, so as to exclude dirt from the piston rod—cylinder joint. The upper end of dust cover 46 is anchored to the upper spring seat 40. The lower end of dust cover 46 rests against an upper surface of the lower elastomeric pad 42.

The present invention relates to the construction of elastomeric pad 42, and particularly to a structural feature for preventing the coil spring 36 from striking vehicle wheel 30 in the event of spring breakage. In this connection, it will be seen from FIG. 1 that the spring is in near proximity to the vehicle tire. The aim of the invention is to contain the lower portion of the coil spring on elastomeric pad 42 in the event of spring breakage, thereby preventing the spring from potentially causing a tire puncture.

Elastomeric pad 42 has a bottom surface 48 seated against the upper surface of platform 44, and a flat upper surface 50 engaging the lowermost convolution of the coil spring. Platform 44 has a peripheral lip 52 (FIG. 2) located radially inwardly from the peripheral edge of elastomeric pad 42. Bottom surface 48 of the elastomeric pad 42 is contoured to fit within lip 52, such that platform 44 helps to prevent lateral dislocation of the elastomeric pad.

The lowermost convolution of the coil spring includes an inner circular spring section 54 (FIG. 2) located in near proximity to the strut side surface and an outer arcuate spring section 56 (FIG. 2) located near the outer peripheral edge of pad 42. Spring section 54 and 56 are connected together by a spiral section of the spring.

Figure 2:
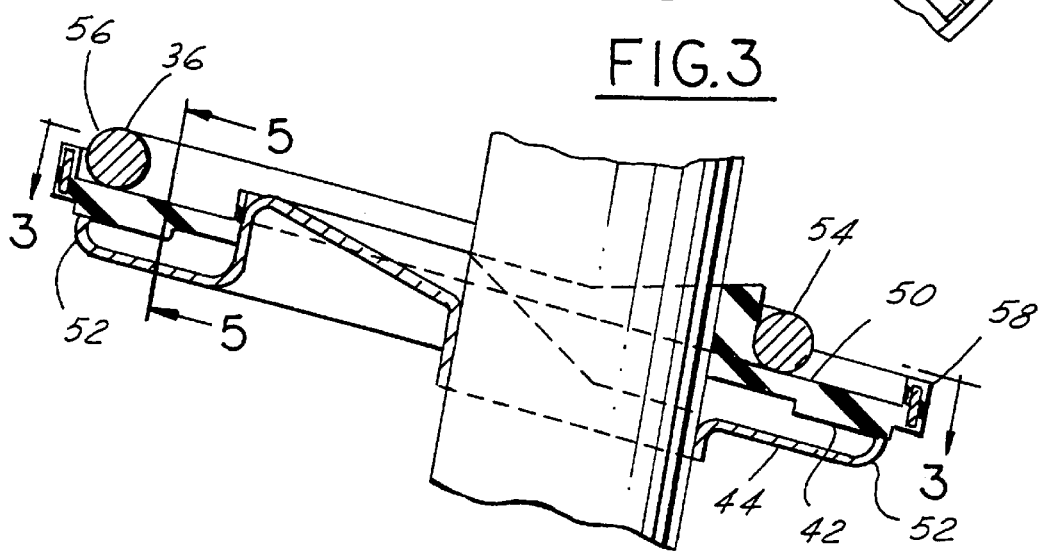
FIG. 2 is a fragmentary enlarged sectional view taken in the same direction as FIG. 1, but showing the elastomeric spring seat pad in greater detail.
Figure 4:
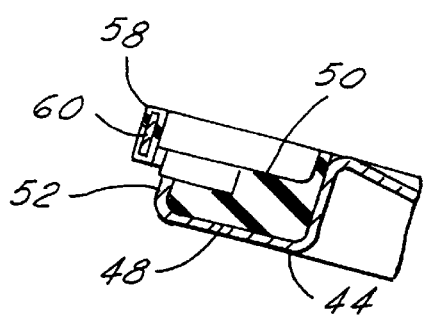
FIG. 4 is a fragmentary sectional view taken in a plane slightly offset from the plane of FIG. 2.

A principal feature of the invention is an upstanding peripheral flange 58 formed on elastomeric pad 42 for containing the lowermost convolution of spring 36 on pad surface 50 in event of coil spring breakage. As shown in FIGS. 2, 4 and 6, flange 58 is reinforced by an annular rigid band 60 incorporated within the flange during the pad molding operation. Band 60 is preferably formed out of steel or other high strength material. Preferably the band has a rectangular cross section, as shown in FIG. 6, whereby the reinforcement action of the band extends through substantially the entire height of flange 58.

As shown in FIG. 6, the height of flange 58 is greater than one half the diameter of the coil cross section, such that the coil convolution is prevented from riding up over the edge of flange 58 in event of spring breakage.

An advantage of incorporating the reinforcing band into the elastomeric pad (rather than making the reinforcement part of the rigid platform) is that the overall diameter of the spring seat assembly can be reduced. Also, the weight of the rigid platform can be reduced. Further, by locating reinforcement bard 60 in the pad flange 58 there is a greater conformity of the reinforcement band to the opposing surface of the coil convolution. Also, the reinforcement band can be formed out of a high strength material resistant to fracture or failure under the expected load forces.

What is claimed:

1. A vehicle wheel suspension comprising:
   an upstanding shock absorber strut having an axis and an annular helical coil spring surrounding said strut, said coil spring having an axis angularly offset from said strut axis;
   a rigid annular upwardly-facing platform affixed to said strut, said platform being concentric around said coil spring axis; and
   an annular elastomeric spring seat pad positioned on said platform; said elastomeric pad having an annular upwardly-facing spring seat surface, and an upstanding lip (72) concentric around the coil spring axis, said upstanding lip comprising an inner lip section (74) having an inner surface engaged with an outer side surface of said strut, whereby said elastomeric pad positions the coil spring relative to the strut;
   said coil spring having a lowermost coil convolution that has pressure engagement on said pad;
   said lowermost convolution comprising an outer arcuate section (56) aligned with the remaining coil convolutions, an inner arcuate section (54) located radially inwardly from said outer section, and a spiral section connecting said outer section to said inner section; said inner arucate section of the lowermost coil convolution extending partially around the strut circumference and having surface engagement with the inner section of the upstanding lip, whereby said upstanding lip serves as a locator for the lowermost convolution of the coil spring.

2. The wheel suspension of claim 1, wherein said inner arcuate section of the lowermost convolution extends around approximately one half of the strut circumference.

3. The wheel suspension of claim 1, wherein said elastomeric pad has an upstanding peripheral flange (58) concentric around the coil spring axis to confine the outer arcuate section of the coil lowermost coil convolution.

4. The wheel suspension of claim 1, wherein said inner lip section (74) of said upstanding lip envelopes approximately one half of the strut circumference; said inner arcuate section of the lowermost coil convolution following closely along the entire side surface of said inner lip section around one half of the strut circumference.

* * * * *